(No Model.)
J. T. MORROW.
APPARATUS FOR CIRCULATING AND PUMPING LIQUIDS.
No. 539,075. Patented May 14, 1895.
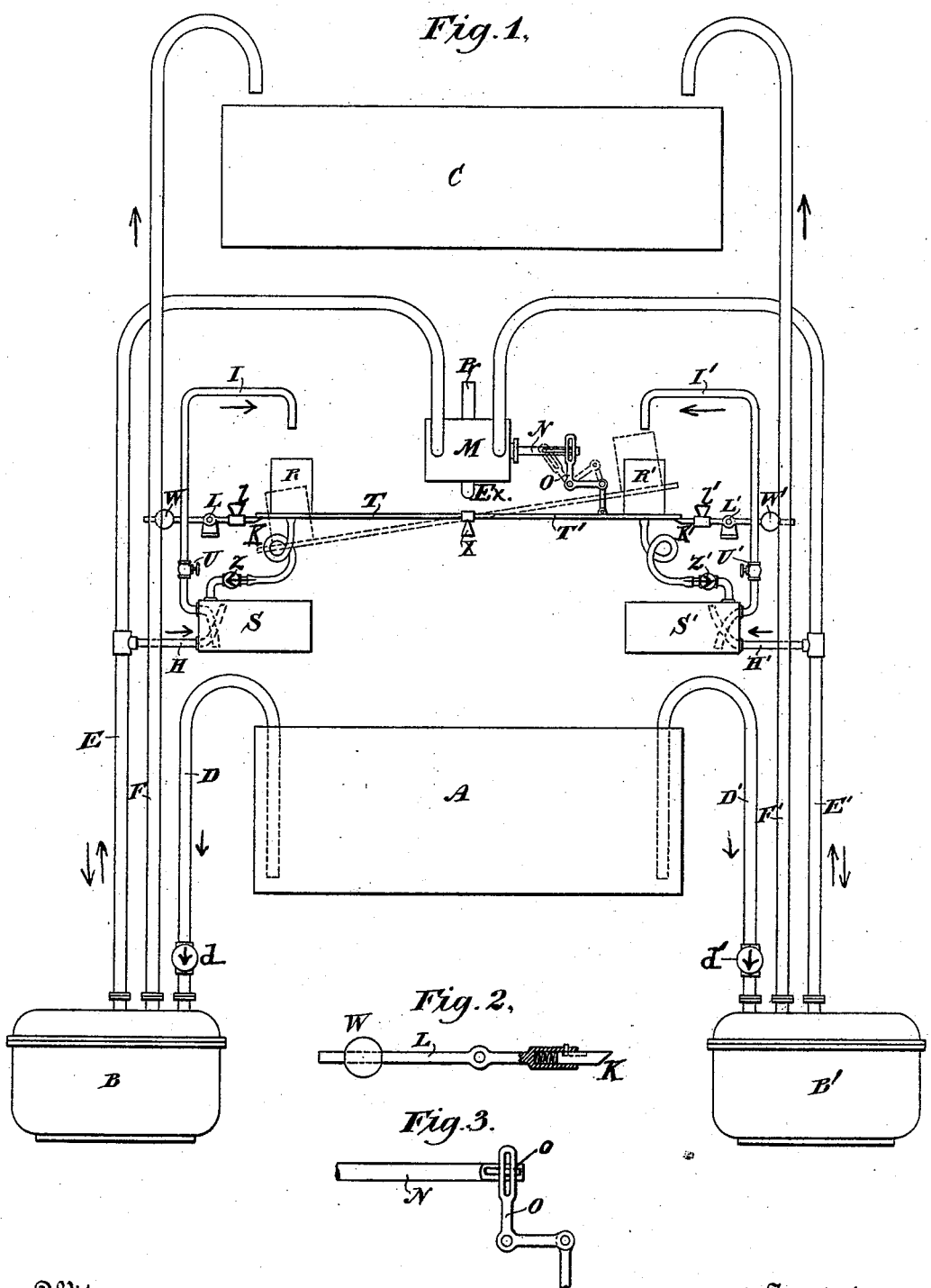

UNITED STATES PATENT OFFICE.

JOHN T. MORROW, OF GREAT FALLS, MONTANA.

APPARATUS FOR CIRCULATING AND PUMPING LIQUIDS.

SPECIFICATION forming part of Letters Patent No. 539,075, dated May 14, 1895.

Application filed November 9, 1894. Serial No. 528,302. (No model.)

*To all whom it may concern:*

Be it known that I, JOHN T. MORROW, of Great Falls, Montana, have invented certain new and useful Improvements in Apparatus for Circulating and Pumping Liquids, of which the following is a description, referring to the accompanying drawings, which form a part of this specification.

My invention relates to automatic means for causing the practically continuous flow of acids, electrolytes, or other liquids from one tank or reservoir to another, particularly by means of compressed air though it is of course in no way limited to such a source of pumping power.

The object is to effect a simple, reliable and inexpensive apparatus for producing such flow or circulation and to this and certain other more incidental purposes which will hereinafter more fully appear, my invention, in one of its most preferred forms, is embodied in the apparatus and its several parts constructed, arranged, combined and used in a manner similar to that hereinafter described, illustrated and claimed.

A pair of air tight tanks or shells, which for convenience I will term eggs, are each provided with a pressure pipe from a controlling valve, a supply pipe from the supply tank and an uptake, or discharge passage, to the receiving tank. The controlling valve is operated to permit the air pressure to be supplied to one egg while the pressure pipe is open and exhaust takes place from the other egg. Gravity or suction draws the liquid from the supply tank into the egg when exhaust takes place and at the same time the pressure supplied to the other egg closes the check valve in the supply pipe and expels the fluid from the egg through the uptake and into the receiving tank.

The controlling valve is actuated hydraulically and automatically in the following manner: A balance lever provided with a light controlling tank at each end is connected with the valve stem. When the pressure is admitted to one of the eggs the same pressure, entering a small closed reservoir filled with liquid, expels that liquid through a passage into the controlling tank upon the raised end of the lever, causing it to descend at the proper time and reverse the controlling valve, after which the controlling tank automatically empties itself, while the controlling tank at the other end of the lever is gradually filled, in a manner similar to that just described, and as the other half cycle of the apparatus takes place.

The closed reservoirs and balance, or controlling, tanks are filled with any desirable liquid such as oil or water, and have no liquid connection or communication whatever with the liquid to be pumped or circulated, so that the invention is particularly applicable to acids and electrolytes for plating and other apparatus, as the controlling tanks are entirely distinct from the pumping or circulating members.

Such briefly is the construction and operation of the most preferred form of my apparatus. Its details will be more clearly apparent from a consideration of the accompanying drawings, wherein—

Figure 1 is a diagrammatic illustration of my apparatus as a whole, and Figs. 2 and 3 detail views and some of the attachments of the controlling-lever that operate the controlling-valve.

Throughout the drawings like letters of reference indicate like parts.

At A is shown the supply tank and at C the receiving tank for the acids, electrolytes, or other solutions or liquids.

D D' are the supply passages from the supply tank to the pumping or pulsation reservoirs or eggs B B'. Check valves $d$ $d'$ within the pipes D D' prevent the back-flow of the liquid into the tank A; the action of these valves being diagrammatically illustrated by the arrow heads.

The uptakes leading from the eggs B B' are shown at F F' delivering into the receiving tank C as illustrated. Where gravity is employed to fill the eggs B B' from the tank A, there is no suction at any time within the eggs and therefore no check valve need be employed in the uptakes. When the exhaust is open the eggs will fill themselves.

At M is indicated the controlling valve alternately opening the pressure pipes E E' and causing one to communicate with the pressure supply P$r$ while the other is open to the exhaust E$x$.

The valve stem N is actuated through the bell crank O by means of the controlling lever T T' balanced upon the pivotal connection or fulcrum X, and carrying at each end the controlling tanks R R'.

S S' are the controlling receivers which alternately fill and empty the corresponding balance tanks R R' causing the lever T T' to tilt first one way and then the other reversing the controlling valve M as required.

H H' are air pressure passages through which air is admitted to blow out the liquid from the corresponding controlling receiver through the passage I or I' into the corresponding controlling tank, and at Z Z' are shown the flexible passages and check valves which permit the liquid to flow from the tanks R R' back to the reservoirs S S' when the pressure is cut off.

At L L' are shown levers balanced by the weights W W' and normally resting against the stops l l', the dogs K K' being in position to prevent the descent of the adjacent end of the lever T T'. The details of these weight levers L L' and the spring dogs will be clearly apparent from Fig. 2, which shows the lever L.

In Fig. 3 is shown the bell crank O and its pin-and-slot connection o with the valve stem N. From this it will be seen that lost motion is provided so that the valve stem will not be moved until the pin has traveled to the end of the slot in the valve stem.

The purpose, as well as certain necessary details and proportioning of the various parts of my apparatus, will now be apparent from a description of its operation.

Let it be supposed that the controlling lever T T' is at the position shown in the dotted lines. The valve stem N will then be at the extreme left-hand of its travel, and pressure will be admitted through the pipe E' to the right-hand egg B', which will have been previously filled from the tank A. In this position the exhaust is opened from the egg B which accordingly fills with liquid from the tank A. The air pressure supplied through E' to the egg B' expels the liquid from the egg through the uptake F' into the tank C, back-flow through the supply pipe D' being prevented by the check valve d'. While the liquid is being expelled from the egg B into the receiving tank, the pressure in the pressure pipe E' passing through the connection H' forces the liquid,—preferably water or oil—from the controlling reservoir S' through the passage I' gradually filling the controlling tank R'. As this begins to fill the friction of the parts is overcome and the tank descends, turning the lever T T' to the position shown in full lines in the figure; being brought to rest on coming in contact with the spring dog K'. This preliminary movement of the tank takes up part of the lost motion between the bell crank O and the valve stem N. As soon as the tank R' is filled sufficiently to counter-balance the weight W' the weight W' rises allowing the end T' of the lever to free itself from the dog K', and letting that end of the lever fall freely. This falling of the tank R' and corresponding end T' of the lever takes up the lost motion between the crank O and the valve stem N and reverses the valves. The advantage of lost motion is that it permits the parts to acquire momentum so that the valves are moved strongly and quickly throughout the stroke, an essential feature where it is possible for both sides of the valve to be open at once. The reversal of the valve opens the pressure to the egg B and opens the exhaust from the egg B', permitting the latter to fill by gravity or by the suction of the exhaust, if desired, from the tank A. At the same time pressure being shut off from the passage H', the liquid in the tank R' flows back through Z' into the reservoir S' relieving the end T' of the lever. The purpose of the spring dogs K K' is to permit the free rise of one end of the lever while the other is being depressed by the weight of the controlling tank. The end of the lever rising into contact with the inclined face of the spring dog forces it back against the action of the spring and allows the end of the lever to pass up. The half cycle of operations during which the left hand egg B, and its connected parts are acting to expel liquid from the egg into the reservoir, is in all respects substantially similar to that already described in connection with the right hand egg B', and I will not therefore repeat it. In order to adjust the action of the controlling reservoirs and tanks, I provide the hand valves U U' by which the flow of liquid into the controlling tank may be regulated and timed to correspond with the emptying of the corresponding egg. Of course the valves should be reversed before the egg is entirely empty, as if not, the compressed air would escape through the uptake and very probably the operation of the apparatus would be stopped. From this it is clear that oil, water, or other desirable liquid, may be used in the controlling apparatus and that such liquid has no connection whatever with the liquid which is being circulated or pumped.

I have now described my invention in its most preferred embodiment. I have purposely omitted the enumeration of certain minor details and many modifications of my hydraulic balance and other features which will readily suggest themselves to those skilled in the art, because to set those forth at length would obscure rather than make clear the more essential features.

I claim, however, and desire to secure by these Letters Patent, together with all such modifications as may be made by mere skill in the art, and with only the limitations and restrictions as expressed or by law implied in view of the related arts, the following:

1. In combination, the pair of circulating or pumping reservoirs or eggs B B', pressure pipes E E', controlling valve M therefor, supply pipes D D' and valves d d', discharge pipes or uptakes F F', and the controlling device for the said valve M consisting of the lever T T', connections between the said lever and the valve stem of said valve M, tanks R R' for operating the said lever, reservoirs S S', and fluid connections between said reservoirs and the said tanks R R', and the pressure pipes E E', substantially as set forth.

2. In combination with valve M and pressure pipes E E', the controlling device consisting of the balance lever T T', tanks R R', reservoirs S S', and connections between the said reservoirs and the said tanks and between the said reservoirs and the pressure pipes, whereby liquid may be supplied to and discharged from the said tanks alternately, substantially as set forth.

3. In combination in a pumping or circulating system for liquids, and with the controlling valves and pressure pipes for the compressed air or other source of power, means for actuating the said valves, such means including a hydraulic balance operated by pressure of the said compressed air or other power to shift the said valve, and having no connection with the liquid to be pumped or circulated, substantially as set forth.

4. In combination in a pumping or circulating system and with the lever T T', the controlling tanks R R' and connections for alternately filling and emptying them, forming a separate hydraulic system having no communication for the fluid which is being pumped or circulated, one or more weighted levers L L' provided with spring dogs each permitting the passage of the end of the lever T T' in one direction and interfering with its passage in the other direction, substantially as set forth.

5. In combination with the pumping or circulating system described and the controlling valve or valves therefor alternately operating the two members of the said system, a hydraulic balance controlling the said valve or valves and one or more controlling tanks or reservoirs R R' with connections whereby the tanks or reservoirs are alternately filled and emptied by the operation and cessation of operation of the said members of the system, the said hydraulic balance being entirely distinct from the pumping or circulating members of the system and having no connection or communication with the fluid which is being pumped or circulated, substantially as set forth.

6. In combination, the eggs B B', controlling valve M, pressure connections, and supply and discharge pipes, and a hydraulic controlling balance provided with controlling tanks R R' and connections whereby each of the said tanks is filled while the corresponding egg discharges, and means for causing each of the said tanks to empty while the corresponding egg is filled, the said controlling tanks being entirely distinct from the circulating or pumping members of the apparatus and having no connection or communication with the said supply and discharge pipes, substantially as set forth.

In testimony whereof I have hereunto set my hand, at Great Falls, Montana, this 23d day of October, 1894.

JOHN T. MORROW.

In presence of—
C. T. BOAL,
W. D. DICKINSON.